United States Patent [19]

LeTourneau

[11] Patent Number: 5,758,152
[45] Date of Patent: May 26, 1998

[54] METHOD AND APPARATUS FOR THE GENERATION AND MANIPULATION OF DATA STRUCTURES

[75] Inventor: Jack J. LeTourneau, San Francisco, Calif.

[73] Assignee: Prime Arithmetics, Inc., San Francisco, Calif.

[21] Appl. No.: 623,628

[22] Filed: Dec. 6, 1990

[51] Int. Cl.$^6$ .................................................. G06F 17/30
[52] U.S. Cl. ........................ 395/613; 395/614; 395/701
[58] Field of Search .............................. 395/148, 150, 395/600, 146, 145, 161, 650, 700, 603, 606–607, 611–615, 622, 701–703, 705, 707, 348, 118, 133

[56] References Cited

U.S. PATENT DOCUMENTS

| | | | |
|---|---|---|---|
| 4,156,910 | 5/1979 | Barton et al. | 364/200 |
| 4,745,561 | 5/1988 | Hirosawa et al. | 395/150 |
| 4,905,138 | 2/1990 | Bourne | 395/650 |
| 4,931,928 | 6/1990 | Greenfeld | 395/600 |
| 4,989,132 | 1/1991 | Mellender et al. | 395/700 |
| 4,991,087 | 2/1991 | Burkowski et al. | |
| 5,021,992 | 6/1991 | Kondo | 364/900 |
| 5,191,522 | 3/1993 | Bosco et al. | 364/401 |
| 5,235,701 | 8/1993 | Ohler et al. | 395/600 |
| 5,265,245 | 11/1993 | Nordstrom et al. | 395/600 |

OTHER PUBLICATIONS

LeTourneau, "The Elementary Theory of Object Oriented Arithmetic", pp. 1–9, Apr., 1990.
Cooper et al, *Oh! Pascal!*, 1982, pp. 295–327.

*Primary Examiner*—Joseph H. Feild
*Attorney, Agent, or Firm*—Flehr Hohbach Test Albritton & Herbert LLP

[57] ABSTRACT

A system for manipulating data structures includes a memory circuit configured to store a table including a plurality of prime numbers and a data structure associated with each prime number. An interface circuit is configured to receive an instruction from a calling procedure and configured to provide a response to the instruction. A processor circuit is coupled to the memory circuit and to the interface circuit and is configured to receive the instruction, to manipulate the table according to the instruction and to provide a response to the interface circuit. The data structures may also be associated with font patterns.

19 Claims, 6 Drawing Sheets

| Index | ith Prime | QBP Constant in Index Order | QBP Constant in Lexicographical Order | QBP Constant in User Font |
|---|---|---|---|---|
| 0 | 1 | () | () | ) |
| 1 | 2 | (0,0) | (0,0) | ( |
| 2 | 3 | (1,0) | (0(0(0(0(0,0)0)0)0)0) | B |
| 3 | 5 | (0,1) | (0(0(0(0,0)0)0)0) | C |
| 4 | 7 | (2,0) | (0(0(0(0,0)0)1) | BB |
| 5 | 11 | (0(0,0)0) | (0(0(0(0,0)1)0) | () |
| 6 | 13 | (1,1) | (0(0(0(0,0)1)0)0) | BC |
| 7 | 17 | (0(1,0)0) | (0(0(0(0,1)0)0)0) | (B) |
| 8 | 19 | (3,0) | (0(0(0(1,0)0)0)0) | BBB |
| 9 | 23 | (0,2) | (0(0(0(1,0)0)0)1) | CC |
| 10 | 29 | (1(0,0)0) | (0(0(0(1,0)0)1)0) | B() |
| 11 | 31 | (0(0,1)0) | (0(0(0(1,0)1)0)0) | (C) |
| 12 | 37 | (2,1) | (0(0(0(1,1)0)0)0) | BBC |
| 13 | 41 | (0(2,0)0) | (0(0(0(2,0)0)0)0) | (BB) |
| 14 | 43 | (1(1,0)0) | (0(0(0,0)(0(0,0)0)0)0) | B(B) |
| 15 | 47 | (0(0,0)1) | (0(0(0,0)(0,0)0)0) | C() |
| 16 | 53 | (4,0) | (0(0(0,0)(0,0)0)1) | BBBB |
| 17 | 59 | (0(0(0,0)0)0) | (0(0(0,0)(0,0)1)0) | (()) |
| 18 | 61 | (1,2) | (0(0(0,0)(0,1)0)0) | BCC |
| 19 | 67 | (0(1,1)0) | (0(0(0,0)(1,0)0)0) | (BC) |
| 20 | 71 | (2(0,0)0) | (0(0(0,0)(1,0)0)1) | BB() |
| 21 | 73 | (0(1,0)1) | (0(0(0,0)(1,1)0)0) | C(B) |
| 22 | 79 | (1(0,1)0) | (0(0(0,0)(2,0)0)0) | B(C) |
| 23 | 83 | (0(0(1,0)0)0) | (0(0(0,0)0)(0(0,0)0)0) | ((B)) |
| 24 | 89 | (3,1) | (0(0(0,0)0)(0(1,0)0)0) | BBBC |
| 25 | 97 | (0(0,0)(0,0)0) | (0(0(0,0)0)(1,1)0) | ()() |
| 26 | 101 | (1(2,0)0) | (0(0(0,0)0)(3,0)0) | B(BB) |
| 27 | 103 | (0,3) | (0(0(0,0)0)0) | CCC |
| 28 | 107 | (2(1,0)0) | (0(0(0,0)0)1) | BB(B) |
| 29 | 109 | (0(3,0)0) | (0(0(0,0)0)2) | (BBB) |
| 30 | 113 | (1(0,0)1) | (0(0(0,0)0)3) | BC() |

| Index | ith Prime | QBP Constant in Index Order | QBP Constant in Lexicographical Order | QBP Constant in User Font |
|---|---|---|---|---|
| 0 | 1 | () | () | ) |
| 1 | 2 | (0,0) | (0,0) | ( |
| 2 | 3 | (1,0) | (0(0(0(0(0,0)0)0)0)0) | B |
| 3 | 5 | (0,1) | (0(0(0(0,0)0)0)0) | C |
| 4 | 7 | (2,0) | (0(0(0(0,0)0)0)1) | BB |
| 5 | 11 | (0(0,0)0) | (0(0(0(0,0)0)1)0) | () |
| 6 | 13 | (1,1) | (0(0(0(0,0)1)0)0) | BC |
| 7 | 17 | (0(1,0)0) | (0(0(0(0,1)0)0)0) | (B) |
| 8 | 19 | (3,0) | (0(0(0(1,0)0)0)0) | BBB |
| 9 | 23 | (0,2) | (0(0(0(1,0)0)0)1) | CC |
| 10 | 29 | (1(0,0)0) | (0(0(0(1,0)0)1)0) | B() |
| 11 | 31 | (0(0,1)0) | (0(0(0(1,0)1)0)0) | (C) |
| 12 | 37 | (2,1) | (0(0(0(1,1)0)0)0) | BBC |
| 13 | 41 | (0(2,0)0) | (0(0(0(2,0)0)0)0) | (BB) |
| 14 | 43 | (1(1,0)0) | (0(0(0,0)(0(0,0)0)0)0) | B(B) |
| 15 | 47 | (0(0,0)1) | (0(0(0,0)(0,0)0)0) | C() |
| 16 | 53 | (4,0) | (0(0(0,0)(0,0)0)1) | BBBB |
| 17 | 59 | (0(0(0,0)0)0) | (0(0(0,0)(0,0)1)0) | (()) |
| 18 | 61 | (1,2) | (0(0(0,0)(0,1)0)0) | BCC |
| 19 | 67 | (0(1,1)0) | (0(0(0,0)(1,0)0)0) | (BC) |
| 20 | 71 | (2(0,0)0) | (0(0(0,0)(1,0)0)1) | BB() |
| 21 | 73 | (0(1,0)1) | (0(0(0,0)(1,1)0)0) | C(B) |
| 22 | 79 | (1(0,1)0) | (0(0(0,0)(2,0)0)0) | B(C) |
| 23 | 83 | (0(0(1,0)0)0) | (0(0(0,0)0)(0(0,0)0)0) | ((B)) |
| 24 | 89 | (3,1) | (0(0(0,0)0)(0(1,0)0)0) | BBBC |
| 25 | 97 | (0(0,0)(0,0)0) | (0(0(0,0)0)(1,1)0) | ()() |
| 26 | 101 | (1(2,0)0) | (0(0(0,0)0)(3,0)0) | B(BB) |
| 27 | 103 | (0,3) | (0(0(0,0)0)0) | CCC |
| 28 | 107 | (2(1,0)0) | (0(0(0,0)0)1) | BB(B) |
| 29 | 109 | (0(3,0)0) | (0(0(0,0)0)2) | (BBB) |
| 30 | 113 | (1(0,0)1) | (0(0(0,0)0)3) | BC() |

FIG. 2

METHOD AND APPARATUS FOR THE GENERATION AND MANIPULATION OF DATA STRUCTURES

FIELD

This invention is in the field of digital computers. More particularly, it relates to methods and apparatus for the creation, manipulation, and display of data structures for use in digital computers.

BACKGROUND

The origins of computers and computer science are rooted in the concepts of algorithms and data structures. To date, the theoretical emphasis has been on the generation and efficient implementation of algorithms. Data structures, which originally included only numbers, were theoretically less well understood although known to be critical to the automation of various mechanical processes. Only recently has a theory of data structures, both as a vehicle to store information and as a tool to solve problems, been recognized and a general methodology of data structures developed.

The lack of understanding of data structures and their efficient implementation, manipulation and display has led to many difficulties. Perhaps the most important of these difficulties is the almost complete lack of standards for creating and manipulating data structures. Presently, every computer programmer defines and uses his or her own methods for creating and manipulating data structures. Although particular data structures such as binary trees and linked lists have acquired a certain uniformity of style for their creation and manipulation, there is still no standard even for these common data structures.

This non-uniformity has several large costs associated with it. First, as every programmer must create their own data structures separately every time a program is written, a great deal of effort is expended "recreating the wheel" with each new program. Along with the effort wasted in recreating the data structures, an associated problem is debugging the code creating the data structure every time a new program is written. In addition, as each program is created in a specific operating environment or with a specific operating environment in mind, programs which operate on one computer may be restricted to only that type of computer. The expense of continually rewriting the same software and the limitations imposed by non-portable software are serious concerns.

What is needed is a standard method and apparatus for creating, manipulating, and displaying data structures, with the data structures so created being readily portable from one computer to another. The structures created should be adaptable to imitate, if not recreate, known data structures, should be flexible enough to describe and manipulate new data structures, and the form of the structures should facilitate operations such as comparison of and addition to the data structures. The apparatus which creates the data structure should also be able to display them in a readily comprehensible format.

SUMMARY

The present invention, in a first preferred embodiment, comprises a method and apparatus for the creation and manipulation of data structures. This method and apparatus will operate on any number of different computers and will interface with most computer languages. The data structures created by the present invention can be manipulated by the host program and treated as any standard, known data structure. If the host program defines a unique type of data structure, the present invention can readily adapt its structures to accommodate the host. Comparisons, additions, and other manipulations of the universal data structures are all performed transparently to the host program. These manipulations can be performed very efficiently, due to the unique underlying structure defining these data structures.

In a first preferred embodiment, the present invention comprises a Table Facility and a Logic Processor. The Table Facility comprises the method and apparatus to generate the data structures and to store the generated data structures. Although the method of generation will be discussed in the detailed description, it should be stated that the method results in a list of constants that when presented visually are readily understood by a human being as logically coherent, indeed almost intuitive in both their generation and in their ability to represent common data structures. Although the list of constants is conceptually infinite, only a finite number of constants are actually stored.

The Logic Processor is coupled to the Table Facility and is itself comprised of three units; a lexical analyzer, a parser, and an execution unit. The lexical analyzer receives a call from the host program which call requires manipulation of the data structures in the Table Facility and reduces that call to tokens which the parser can understand. The parser converts these tokens into an internal source program. Finally, the execution unit uses the internal source program to perform the various manipulations of the data structures. The output of the logic processor is transmitted back to the host program.

In other embodiments, the Logic Processor can be provided with a Library Facility which provides a number of standard routines allowing the Logic Processor to create and manipulate known data structures. Samples of such routines include a binary tree file structure routine and a hierarchical file structure routine. Additionally, an Icon Manipulator can be provided. The Icon Manipulator presents the date structures in an easily understood visual form. The Icon Manipulator can also perform certain manipulations of the data structures in a "visual" manner.

The creation and operation of these preferred embodiments will now be described in detail, with reference to the figures listed below.

BRIEF DESCRIPTION OF THE DRAWINGS

FIG. 2 is an example of a table created by the Table Facility of the present invention;

GLOSSARY

Figure 1:
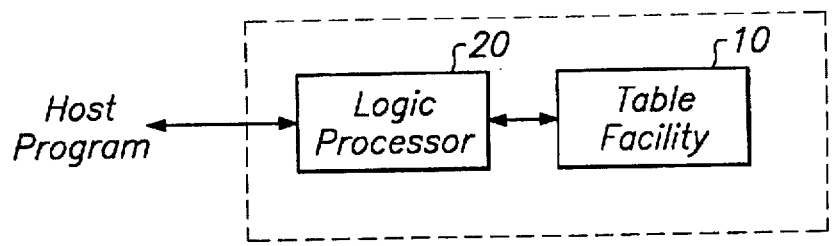
FIG. 1 is a block diagram of a first preferred embodiment of the present invention.

This glossary contains terms used in this specification. The reader is urged to reference this glossary if any term used in the specification is unclear.

algebraic—having to do with algebra and especially algebraic operations. Bachus/Naur normalform—a method for describing compiler syntax relationships invented by John Bachus and Edwin Naur of IBM in 1959. Used as the input notation form for the UNIX compiler tool, yacc.

base—(for a radix positional notation for natural numbers). The natural number b, used in the $c_0b^0+c_1b^1+c_2b^2 \ldots +c_kb^k$ description of a number.

binary operator—any operation that requires exactly two input values before computing an output value.

binary—having to do with two.

binary string—any finite string of 0's and 1's, including the empty string. The collection of all binary strings is usually denoted by the symbols $\{0, 1\}^*$.

Boolean natural number—either the natural number 0 or 1.

bounded resource quantification—quantification restricted by some easily expressed limit or bound, usually in an attempt to control the combinatorial complexity of the computation.

constant—a linguistic token with a fixed meaning or value.

decidable set/relation—a set or relation which can be analyzed by a computer such that the computer can answer any yes or no question regarding set/relationship membership. Compare recursively enumerable set/relation.

dimension—(of a syntactic descriptive notation for natural numbers) the natural number, b, which is two more than the number of (totally) free generators of the syntactic scheme.

empty set—the set with no elements; usually denoted by 0 or ø.

empty string—the string of length 0 usually denoted by 0 or nil.

finite multi set—a multi set that has a finite number of elements.

finite sequence—a finite ordered collection of possibly repeating elements. Each element of the Sequence is said to have a natural number position, or index, within the sequence.

first-order logic—a standard formal language used by mathematicians to describe the foundations of mathematics. Allows all Boolean truth table operations as well as quantification over some universe of possible values. Contrasted with second-order logic which includes first-order logic and allows quantification over the subsets or subrelations of the universe of meaning or value.

generators—refers to a set of elements in an algebraic structure used as a base to construct all the other elements of the algebra by using the algebra's operators. For example, zero, by itself, is a generator of the set of all natural numbers, using the operation of successor. 1, by itself, is a generator of the set of all positive natural numbers under the two operations of prime enumeration (see Kleene prime enumeration operation) and multiplication.

induction—a method used to construct sets or relations based on the idea of specifying the legal or available starting elements of the construction and the rules of continuation. Usually associated with methods of proof for number theoretic theorems and proofs of correctness for program construction.

isomorphism—a relationship of equality between (similar) algebraic or relational structures. Defined by some 1—1 function between the universes of the two structures that preserves the operations and relations of the structures.

Kleene prime enumeration operation—the monadic operation defined on either the positive natural numbers or all the natural numbers that lists in arithmetic order, the prime natural numbers. Usually denoted by p. For example, $p(1)2, p(2)=3, p(3)=5' \ldots$ or $p(0)=2, p(1)=3, p(2)=5, \ldots$ ; with context determining the appropriate meaning. Named after the 20th century American mathematician Steven S. Kleene who first studied this operation.

model—refers to an algebraic structure containing a non-empty universe and a certain number of operation and relations defined on the universe.

monadic operator—any operation that requires exactly one input value before computing an output value.

multi set—an unordered collection of elements which allows multiple copies of the same element to be contained within the set-like object.

numeral—an alphanumeric or iconic name for a number.

numeral system—a numeral representational scheme, usually for the natural numbers, and one or more algorithms, based on the representational system, for manipulating the numerals.

natural number—any of the numbers usually named by common Arabic ciphers 0, 1, 2, 3, 4, . . . . Contrasted with the integers which are natural numbers with a directional sign, the rational or fractional numbers, the real or decimal numbers, or any of a number of other kinds of numbers.

prenex normal form—refers to first-order logic formulas wherein all quantifiers precede any and all Boolean operations on atomic terms or parts.

parameter—a linguistic token with a variable meaning or value.

prime natural number—a natural number with exactly two divisors: i.e. any of the numbers usually named by 2, 3, 5, 7, 11, 13, . . . .

quantification—either looking within a specified place for an instance or example of some element that satisfies a specified relationship (existential quantification) or looking within a specified place to discover if all the elements of the specified place satisfy a specific relationship (universal quantification).

Quintessential Boolean Prolog—(QBP) A high-order logic programming language based on first-order logic and bounded Boolean multiset evaluation.

relational—having to do with relation symbols or relationships between elements. For example, the symbol '<' usually denotes the less than relation between natural numbers, as contrasted with the common arithmetic operation symbols + and *.

radix positional notation—our usual numeral system for the natural numbers; based on the notion of a gear shaft and leading to a geometric series description for natural numbers. For example, in base 10, each column represents a successive power of 10.

recursively enumerable set/relation—a set or relation which can be analyzed by a computer to the extent that the computer will answer truthfully any positive membership query and will never lie, even when a negative answer cannot be given, on no membership questions. If both a set/relation and its set-theoretic compliment within some universe are both recursively enumerable then the net/relation is called a decidable set/relation.

set—an unordered collection of elements, no two of which are identical.

subelement—refers to an element of an element. Usually used in the context of sets or strings where the more precise meaning refers to set-theoretic elements of elements or sub strings of substrings (of strings).

syntactic algebraic notation—an algebraic numeral system for the natural numbers based on the concepts presented in "The Elementary Theory of Object Oriented Arithmetic" by Jack J. LeToumeau (published on the Internet at site http://www.primearithmetics.com). Each syntactic notational system has a dimension, an idea corresponding to the base idea of radix notation.

k-tuple—refers to collections of finite sequences of fixed length k; ex. 2-tuples, 3-1 tuples, 17-tuples, 23-tuples, etc.

unary operator—any operation that requires exactly one input value before computing an output value.

variable—a linguistic token used to indicate a range of meaning or value.

virtual—refers to a data structure software construction which allows the user to perceive and interact with the data structure as if it were infinite, even though the computer, being a finite storage device, stores at most part of the data structure.

witness—refers to the value of some existential quantifier.

yacc—a UNIX tool for the creation of compilers (stands for 'yet another compiler compiler').

DETAILED DESCRIPTION

Figure 5:
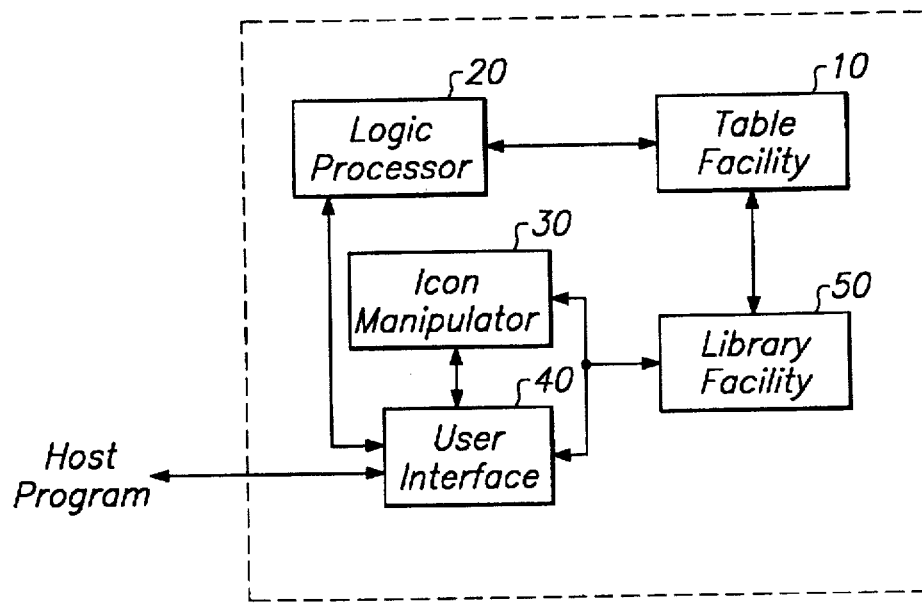
FIG. 5 is a block diagram of the second preferred embodiment of the present invention.

A first preferred embodiment of the present invention is comprised of two modules: a Table Facility 10 and a Logic Processor 20, as shown in FIG. 1. A second embodiment of the present invention further comprises an Icon Manipulator 30, a Library Facility 50 and Language Interface 40 (also called User Interface), as shown in FIG. 5. In the description which follows, each embodiment will be described individually. Also, the functional interaction of these modules will be described in the context of several uses of the present invention.

As all embodiments of the present invention interact with a programming language called Boolean Prolog, this detailed description begins with a brief overview of that language.

Boolean Prolog

Boolean Prolog is an algebraic first-order language based on two constant symbols, 0 and 1, one monadic operation symbol ('⌐'), and one binary operation symbol ('*'). It is known that any other algebraic or relational first-order language can be interpreted efficiently and without loss of generality within the Boolean Prolog language.

Associated with the Boolean Prolog language is a family of models (also known as the natural arithmetic models or interpretations) BPAM.0, BPAM.1, BPAM 2, . . . , BPAM.d . . . . Each of these models is characterized by the value of a single natural number d, which is called the dimension of the model.

The universe of all Boolean Prolog arithmetic models is the set of all natural numbers. The constants 0 and 1 are always used to name the Boolean natural numbers zero and one. The binary operation symbol '*' is always used to name the binary natural number operation of ordinary multiplication. The meaning of the monadic operator '⌐' changes with the dimension of the model. When the monadic operator acts on zero, and the dimension d of the model is zero, one is returned. If the dimension of the model is other then zero, the monadic operation acting on zero returns two. When the monadic operator acts on any positive natural number i, it returns $P_{i+d}$, where P is the Kleene prime natural number enumeration operation and d is the dimension of the model.

The Kleene prime enumeration function acting on the $J^{th}$ positive natural number returns the $J^{th}$ prime number; i.e. Kleene prime enumeration operation is P(1)=2, P(2)=3, P(3)=5, etc. This prime enumeration operation is known.

For each Boolean Prolog arithmetic model there is an associated isomorphic string-based model. Herein, isomorphic describes models or algebras which, although they may appear different, are logically the same. All the string-based models are based on the set of all finite rooted trees, each tree storing ordered d-tuples of natural numbers in their nodes, where d is the dimension of the model. The Boolean Prolog arithmetic models and their related string-based isomorphic counterparts are called the natural models of Boolean Prolog.

During the initialization of the system, the dimension of the intended model is chosen by the user. This parameter selects intuitively the length of the natural number data tuples stored within the nodes of each particular data structure. For example, if the data structure of the system functionally duplicates a binary tree, the tuples can represent the information stored in each node of the binary tree. The dimension of the user's model also indicates or can be interpreted as the number of free algebraic generators used within the model. This information is always available to the Logic Processor. The dimension number is also used by the Table Facility and by the Icon Manipulator to create the screen drivers.

The system, for its own internal purposes, uses as its fixed model the natural Boolean Prolog string model dimension of 2. Use of dimension 2 allows the present invention to perform arithmetic most efficiently as a string-oriented process.

The universe of the internal model of the present invention is itself a set of first-order syntactic string constructions. It realizes in a computer language a well-known model theoretic technique introduced by L. Henkin. See "Journal of Symbolic Logic", vol. 14, 1949 (p. 159–166).

The Table Facility

The internal objects of the present invention are known first-order syntactic constructions describing tree structures storing ordered pairs of. natural numbers within the tree nodes.

The Table Facility 10, as shown in FIG. 1, creates, for use by the Logic Processor, a four column virtual table, called herein the Quintessential Table ('QT') and shown in FIG. 2. The $0^{th}$ (virtual) column of the table is an index, beginning with zero. Column 1 begins with 1 and then lists all prime natural numbers, the $i^{th}$ prime corresponding to the $i^{th}$ index. Column 2 is the internal constant which represents the row's index. In some embodiments, a third column is appended to columns 0 through 2 and contains the constants sorted in a particular fashion which facilitates fast binary searches. Column 4 displays the constants of column 2 using one of a number of user-selected fonts corresponding to the user-selected dimension. Although the generated table is of finite length, the present invention operates with the presumption of a virtual table of unlimited length.

There are four steps in generating the table: generating the primes, generating the constants, sorting the constants, and creating the user font. There are several known methods for generating prime numbers, some of which have been implemented as computer programs. For example, see Knuth, "The Art of Computer Programming," vol. 1, "Fundamental Algorithms", pp. 143–145. As prime generation algorithms are known, no further description is required.

To generate the constants, three functions are needed. The first, genpop() receives a constant and returns the constant in encapsulated form. For example, genpop(s) returns (OsO). The second function, unmarked(), returns the next unmarked constant. Third, a function qbp-sum() is provided that returns the sum of two constants x and y.

The method for generating the series of constants is as follows:

A. If i=0, then the constant is "()".
B. If i=1, then the constant is ."(0,0)".
C. If i=2, then the constant is "(1,0)".
D. If i=3, then the constant is "(0,1)".
E. If i>3 and i is a prime number, then the constant is the encapsulation of the constant found two rows below (towards lower index values) the prime index of the value i.
F. If i>3 and is non-prime, then the constant associated with i is the sum of the constants associated with the lowest multiplicand, and its multiplicator whose product is i, where the definition of sum is generally stated as adding the left and right numeric tags of the two constants and simultaneously string concatenating the middle and interior portions of the constants.

FIG. 2 shows a sample table created by the Table Facility having an index running from 0 to 30.

Two separate subprograms are used to generate the table herein. These two subprograms are called genprime and gentable. The program genprime generates the ith prime column of the table, i being a user-specified parameter. The source code listing for an exemplary embodiment of the genprime program is listed below under the heading Source Listing for "genprime" Program.

The program gentable compiles the constants in index order and then places them in sorted lexicographical order. The source code listing for an exemplary embodiment of the gentable program is listed below under the heading Source Listing for "gentable" Program.

Column 4, containing the constants displayed in the user's font "outfix," for example, is generated in the following manner. At table generation time, the user specifies a model dimension value k, which represents the number of free generators the user font should have, free generators being arbitrary symbols (which default to uppercase letters). In addition, the user may choose a concatenation symbol (which defaults to null), and a pair of encapsulation symbols (which default to left and right parenthesis).

The algorithm for generating the series of QBP-constants 1 ... m, in the user outfix font, where m is the size of the table and i is an element of the series, is as follows:

1. If i is 0 then the QBP-constant is ")".
2. If i is 1 then the QBP-constant is "(".
3. If i>1 and i is prime, and there are still free generators available for use, then the QBP-constant is the value of the next available free generator. Otherwise, if there are no more available free generators, then the QBP-constant is the encapsulation of the value returned by the function unmarked().
4. If i>1 and i is non-prime, then the QBP-constant is the product of the lowest multiplicand and multiplicator whose product is i, or x,y, expressed as the string concatenation of x+y.

Although the table in the present embodiment is constructed using ASCII characters to denote constants, several compression methods can be used to encode the constants alphabet in 2-bit tokens. It should also be noted that although the generated table is of finite size, the present invention operates using the assumption that the table is an infinite or virtual table.

The Logic Processor

Figure 3:
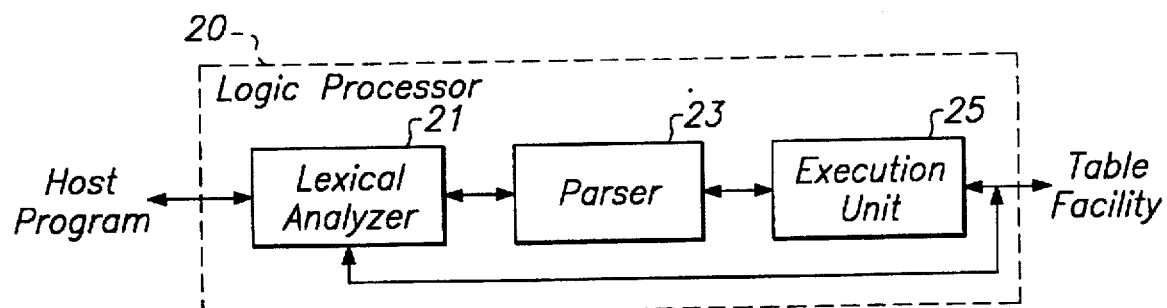
FIG. 3 is a more detailed block diagram of the Logic Processor.

The Logic Processor 20, shown in FIGS. 1, 3, and 5, receives both a first-order Boolean Prolog logic formula and a series of constants from the host program. The formulas resemble and are similar to function calls in known computer languages. The constants are equivalent to the parameters that are passed during a function call. In the preferred embodiments, these constants are in a special internal form suggested by the mathematical definitions which generate the table facility.

The Logic Processor accepts for evaluation a standard first-order formula of the form $\beta(w)$, w being a free variable, and returns a 1, when true, indicating that there is a constant W or "witness" such that $\beta(W)$ is true when the quantifiers are restricted to a universe determined by W.

In the Logic Processor, the formula received from a language interface is converted into a prenex/disjunctive normal form, this form being known to those familiar with mathematical logic. Each user-supplied constant is likewise converted into the internal form used by the Table Facility.

The Logic Processor operates by searching the table created by the Table Facility, looking for an entry or witness in the table which makes the formula true when the quantifiers of the formula are restricted to the subelements or sub-subelements of the witness. This restriction of the search to subelements and subsubelements is sufficient when the user selected dimension is 2 or more. For a user dimension of 1, three levels of search are required and for a user dimension of 0, 4 levels of searching are required. If such an entry or witness is found, the Logic Processor returns a 1 to the host program. In the event that the Logic Processor input formula is of a particularly simple form, the Logic Processor, instead of searching for a witness in the table, directly creates the first possible witness for testing.

The Logic Processor, as shown in FIG. 3, is functionally composed of three parts: a lexical analyzer 21, a parser 23, and an execution unit 25. The lexical analyzer is hard-coded, and provides built-in identification of constants through a simple Table Facility table look-up. The basic function of the analyzer is to return tokens to the parser.

The parser is implemented in yacc, which stands for Yet Another Compiler Compiler. The basic function of the parser is to reduce a source program into an internal format that the execution unit can evaluate.

The execution unit is the unit that takes the output from the parser and actually evaluates the Boolean Prolog formulas.

Unless otherwise instructed, the Logic Processor, after accepting the preprocessing its input, beings a systematic search for a constant or witness in the third column of the table created by the table facility.

The formulae received by the Logic Processor are standard first-order formulas and are thought to be interpreted over a universe determined by as-yet-to-be-discovered witnesses. The Logic Processor asks the Table Facility to provide, in the order defined by the Table Facility, each possible candidate for such a witness W. If a satisfactory witness is found at any given moment, the Logic Processor reports success to a Language Interface coupled to the host program. If the witness being checked fails, the Logic Processor requests that the Table Facility to provide the next possible witness in the test being searched.

It is a natural consequence of the Boolean Prolog language, the theory underlying it, and the implementation of the Table Facility, that the preferred embodiments of the present invention offer a natural way to efficiently solve or organize problems for solution in parallel. Known in the art is the fact that once a problem has been broken down into a set of logical AND OR questions or statements, each part of the logical question so stated can be solved separately. For example, the question, "Is A member of sets B and C", can be solved by simultaneously searching for A in sets B and C. The use of the prenex normal propositions in the preferred embodiments is well suited for this type of AND/OR parallel processing.

In addition, however, although standard prolog problem descriptions are used, the range of possible witnesses to any constant is bound to a maximum of two levels of searching. As earlier noted, the levels of required search increase to three in the case of a model whose dimension is one and to four if the dimension is zero. In other words, the evaluation or witness search only proceeds as far as subconstants and sub-subconstants (or subsubsubconstants or subsubsubsubconstants). As the possible substitution set is always known, each possible group of constants can be automatically assigned to a different processor, and all these searches can proceed in parallel.

In certain cases, the systematic search can be avoided because of the form of the Boolean Prolog formula being scanned. In particular, if the sentence is "closed downward", or inductive in form, the Logic Processor will recognize this from the syntax of the sentence and will build the witness W by a process different from searching the table. This specifically constructed witness is then used for comparison to the formula received from the host program. In particular, a Closure function described later is used. As many commonly used abstract data structures can be defined in this closed downward fashion, and as the Logic Processor is an efficient processor in these cases, it is generally preferable to use this technique.

In general, as the semantic evaluation of Boolean combinations of equations and first-order quantifier clauses (restricted to subterms and sub-subterms of some possible witness W) is a normal and understood process, it thus remains only to define the semantic evaluation of the atomic equation clauses. A definition of the semantic meaning or interpretation of equations is described below.

To evaluate an equality, identify the equality as true if, and only if, the two associated trees, each storing ordered pairs of natural numbers, are isomorphic in the usual mathematical sense. In order to tell if two nonempty trees storing ordered pairs of natural numbers are isomorphic, each tree can be "hashed", from the bottom up, into a standard form. During hashing, the tree is changed into a different form which facilitates the comparison with other trees, but destroys the meaning. The method to hash a tree is described below. After hashing the trees, the hashed values are compared to see if the trees are identical. The method to perform the hashing takes an amount of time which is a linear function of the complexity of characters used to represent the two input trees.

The quality of two constants being isomorphic to each other is critical in the present invention. The method described below determines isomorphism when the table facility provides a table containing natural numbers $i \leq 255$, and wherein 16-bit quantities store the values of the ordered pairs. The expansion of this method to encompass a table containing more than 256 items is a simple matter of using longer words and other minor modifications which would be obvious to one of skill in the art.

Figure 4:
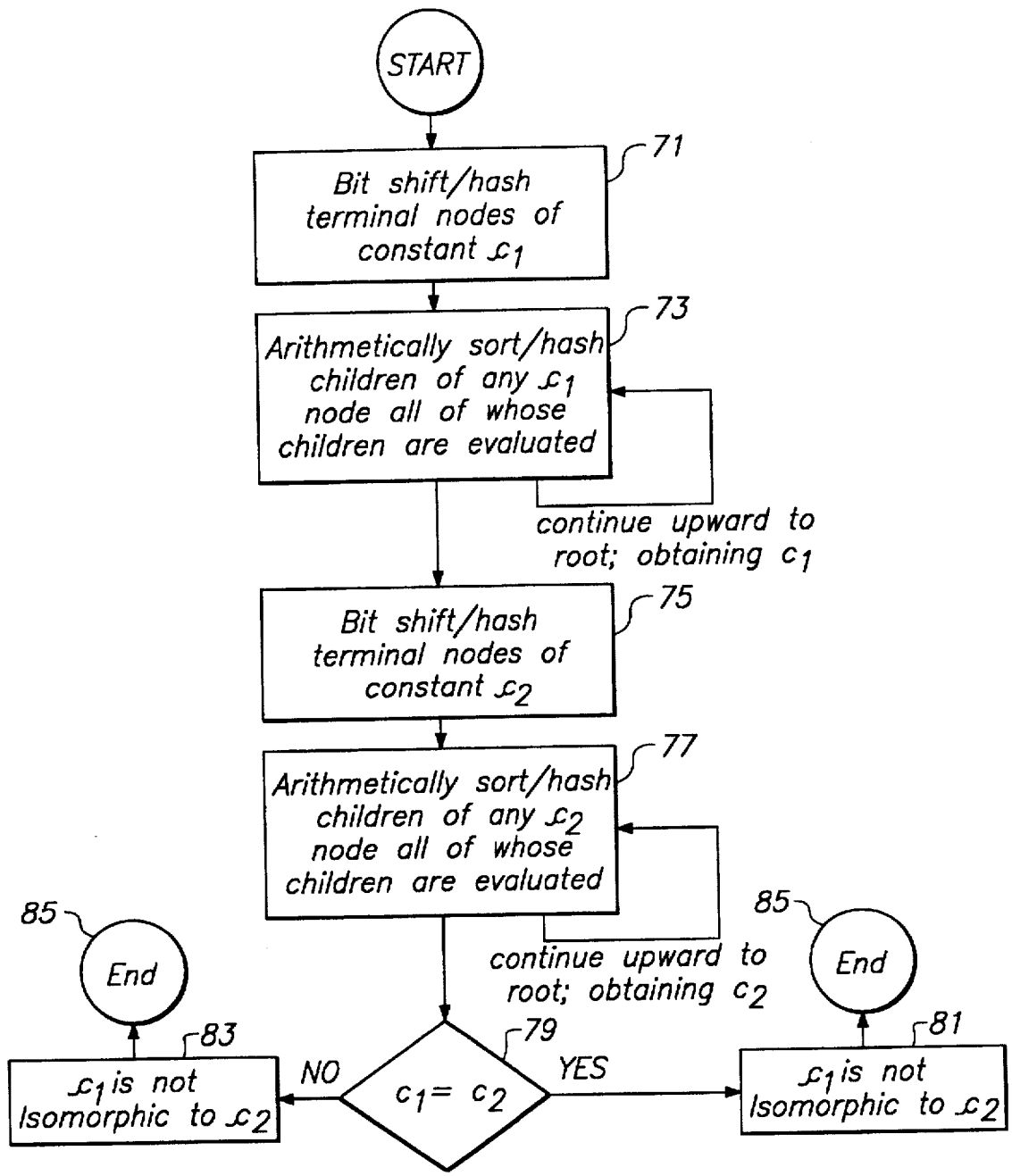
FIG. 4 is a flow chart of the method to hash a tree.

As shown in FIG. 4, which is a flow chart of the tree hashing method, first, at step 71, each terminal node of the constant which stores an ordered pair (i,j) is replaced in the following manner: the left parenthesis is replaced by a '[' and a right parenthesis is replaced by a ']'. The value of the integer i is shifted 8 places to the left and the result is added to j. The resulting number is stored between the left and right brackets. Thus, for the ordered pair (1,2), the resulting string would be encoded [258].

Next, at step 73, the children of any node whose children are all terminal nodes are sorted in arithmetic order using the values obtained in step 71. Thus, the string (0(1.2)(0.2)1) would be converted in step 71 to (0[258][2]1) and in this step to (0[2][258]1).

Next, if a nonterminal node has had all of its descendent nodes evaluated and sorted in normal binary arithmetic order by the previous steps, then, at step 75, replace the nonterminal node by first replacing the left and right parenthesis with "[" and "]", respectively. The value of the integer on the left of the constant is shifted 8 bits and stored after the left square bracket. The value of the integer on the right is stored before the right square bracket. Thus, the string (1(0[2][258]1) (1[2][258]0)1)

transforms to (1[0 [2][258]1][256[2][258]0] 1).

Next, at step 77, the nonterminal nodes transformed in the previous step are sorted in arithmetic order, using the sum of the left (shifted) numerical value plus the values of all dependent nodes reduced in previous steps plus the right (unshifted) numerical value as the value to be sorted. Thus the string (1[0 [2][258]1][256 [2][258]0]1)

transforms to (1[0 [2][258]1][256 [2][258]0]1).

In this case no transformation occurs because the reduced nonterminal nodes are already sorted. This step and the previous step are repeated until the complete string is transformed. The two transformed strings are then compared for equality at step 79 to see if the trees they represent are character by character identical. Regardless of whether the trees are isomorphic (step 81) or not (step 83), the method ends at step 85.

A proof showing that the described method, along with a method implementing first-order bounded resource quantification, limited to two-deep levels of submembership, is universal, in the sense that all recursively enumerable relations are multiplicatively represented within this system, is based on concepts presented in "The Elementary Theory of Object-Oriented Arithmetic" (see especially Theorem 3 and its proof), by Jack J. LeTourneau and published on the Internet at site http://www.primeartithmetic.com.

In the preferred embodiment of the Logic Processor, the grammar used to write the formulas is describable in a Bachus-Naur normal form. Within the formal grammar, there are tokens, terms, equations and formulas. Each of these is described in the forma grammar for the Logic Processor which is listed below under the heading Forma Grammar Listing for the Logic Processor.

The Logic Processor may be implemented as an integrated circuit, a logic array, or a microprocessor programmed by a software module, with the software module implemented either as a local or a network-wide file server, as part of a library of run-time routines, or as a standalone computer or interpreter.

A second preferred embodiment of the present invention, shown in FIG. 5, includes a Library Facility 50, coupled to the Logic Processor 20, an Icon Manipulator 30, also coupled to the Logic Processor and additionally coupled to a User Interface module 40. The User Interface module is coupled to the Logic Processor and receives input from the host program. These modules are described in detail below.

The Library Facility

The Library Facility 50 provides a variety of additional routines which can be used by both the Logic Processor and Language Interface to manipulate those terms created and stored by the Table Facility.

In this second preferred embodiment of the present invention, the Library Facility comprises seven string manipulation routines which treat constants as strings. These routines present the primitives resulting from their operation to the Logic Processor.

The function left(const) returns the integer value of the natural number immediately following the first left parenthesis of the constant. For example, the call left((1(0,0)2)) returns 1.

The function right(const) returns the integer value of the natural number immediately preceding the last right parenthesis of the constant const. For example, the call right((1 (0,0)2) returns 2.

The function mid(const) returns the sub-constant obtained by stripping the first left parenthesis and the following natural number, and the last right parenthesis and the preceding natural number of the constant const. The result may be nil in case the argument represents an ordered pair. For example, the call mid((1(0,0)2)) returns (0,0), and the call mid((0,0)) returns nil.

The function sub(const,i) returns the ith proper sub-constant of the constant cons, or nil if there are no ith proper sub-constants in cons. The argument i is zero-based, so the first sub-constant corresponds to the argument 0. For example, if const is equal to (0(1,0)(2,2)0), the call sub (const, 0) returns (1,0), the call sub(const, 1) returns (2,2) and the call sub(const, 2) returns nil.

The function equal(x,y) returns true if x and y are identical constants, and false otherwise. The function equal() is implemented with the C standard library function stamp().

The successor function returns, for any valid term t, t "popped". The successor of t can be thought of as an encapsulation of t. By definition, the successor of t is (0 t 0). Using the table, the successor of t on row i is found on row $P_{i+2}$. The function succ(const) implements a Kleene-like prime enumeration function. The function is implemented in the following manner: let k be the model dimension of the system, let table represent the table of constants, let index (const) be the function that returns an integer representing the row in the table where const occurs, let prime be the column of the table that contains the prime numbers, and let constant represent the column of the table that contains constants. Given these constants, succ() is defined as succ=table [(index (const)+k)–>prime]–>const.

The Library also comprises two additional functions: encap(), which computes the successor of q through string concatenation and is used only in the table generation programs, and succ(const), which computes the successor of q through the table manipulation method just described.

Yet another separate function adds two constants. A first call to function Left() returns the natural number immediately following the first left parenthesis in the constant. Then, a call to Right() function returns the natural number immediately preceding the right most right parenthesis in a constant. As Mid() is a function that returns the string of characters between Left() and Right() in a constant (possibly empty), an Add() function is defined as:

add (p,q)=left (p)+left(q)*mid(p)*mid(q)*right(p)+right (q).

where the "*" symbol represents a string concatenation.

An equality function equal(x,y) returns true is x and y are identical constants and false otherwise.

Another function determines if one constant is a subconstant of a second constant. Also, the closure of a constant inductively defined by disjoint equational conditions can be determined or constructed.

In addition to the described functions, the Library Facility also contains descriptions of standard abstract data types and the relational operators that define the relations between the elements of these abstract data types. These routes can be accessed and used transparently by the host program. In particular, the Language Interface contains an interpreter which reads Boolean Prolog instructions describing either an abstract data type or actions to be carried out upon an abstract data type. The interpreter then follows these instructions either to emulate the specified type or simulate the specified action. This interpreter accepts files created by the Logic Processor and uses these files to complete the definitions required by the interpreter to perform its tasks.

The Library Facility may be implemented in hardware, as part of a microprocessor or in ROM, or in software, as a library of callable routines.

The Icon Manipulator

In a preferred embodiment of the present invention, each constant can be pictorially represented by a set of nested boxes forming a logical icon or diagram. These icons can be directly manipulated using known mouse/icon manipulations. The Icon Manipulator has both static components, comprising the guidelines for drawing the constants, and dynamic components, for performing the mathematical operations of encapsulation and merger visually.

The Icon Manipulator provides standard interface tools to enable the user of the present invention to interact through a visual interface. The Icon Manipulator creates a screen driver, based on initial user input parameters, accepts Boolean Prolog constants, and then uses the screen driver to convert the constants to pixel-oriented host display instructions.

To draw each icon, the Icon Manipulator follows a user-defined font or style guide, which uniformly instructs the screen as to the relative size and placement of the various boxes. The icons can then be manipulated using a mouse in a known fashion, while a special string processing subcomponent of the Icon Manipulator maintains the appropriate correspondence between the screen icons (as displayed) and the underlying constants (as stored). The font maps for the constants may be stored in hardware using a variety of techniques, including bitmaps, compressed bitmaps, and/or vector graphics. In this sense, the term font pattern is intended to encompass both fonts and patterns displayed as icons.

Figure 6:
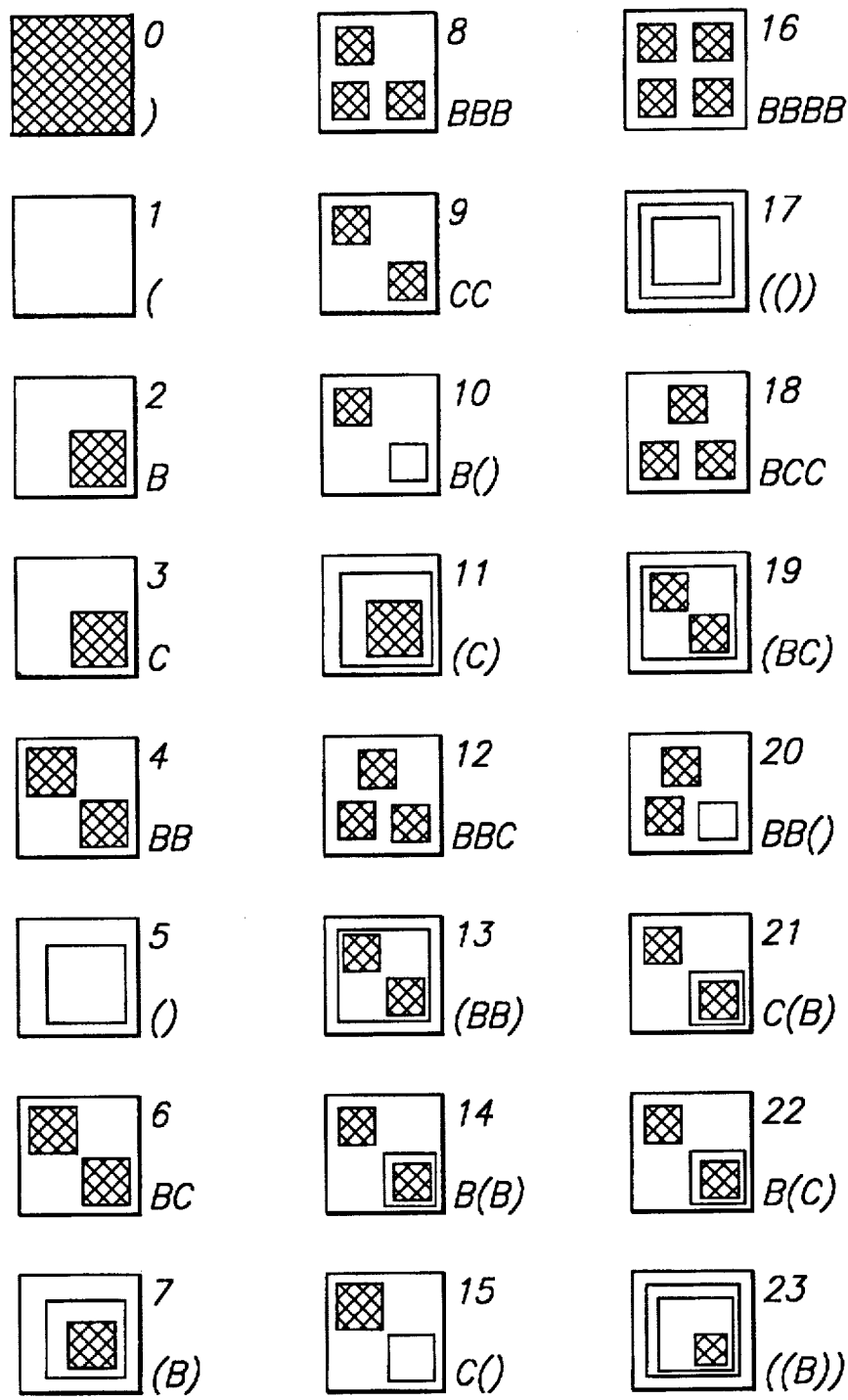
FIG. 6 shows a representative group of icons and the underlying constants.

FIG. 6 shows a sample group of visual icons, named using the user-selected font.

The Language Interface

The Language Interface provides means for a C programmer to access the manipulate the present invention. C language programmers interact with the preferred embodiments of the present invention through C library function calls that manipulate abstract data structures such as sets, trees, binary trees, and queues.

For example, in the C language type definition listed below, there are two void pointers.

```
typedef   struct node_t{
          void *qbp;
          void *user;
          }node_t;
```

The first void pointer, qbp, is used internally by the present invention. The second void pointer, user, can be used by the client program in any way it sees fit. The host program need not be concerned with the implementation details of the type node _t. The host program interacts with variables of type node _t using the interface listed below:

```
node_t * parent (node_t * p);
node_t * child (node_t * p);
node_t * left (node_t * p);
node_t * right (node_t * p);
node_t * merge (node_t * p, node_t *q);
int occurs (node_t * tree, node_t * member);
and
int equiv (node_t * p, node_t *q).
```

The use of C++ to implement the Language Interface would add the benefits of classing, inheritance and operator overloading. Other languages could be used to create an interface between the host program and the present invention. The use of any of these languages is well within the scope of the present invention.

The main components of the present invention and their method of operation have now been described. In order to further understand the present invention, several possible uses of the invention will now be described.

As has been stated, the present invention can be used to create a visual model of common abstract data structures.

Listed below are two samples of pseudo-code describing a hierarchical file structure data type and a binary tree data type. Each example contains a one-free variable first-order formula, called the universe of the data type, that when interpreted with the present invention and its internal Boolean Prolog language, yields a solution set that can be seen to visually imitate or interpret, in the presence of the predicates defining movement or relationship, the named data type.

Figure 7:
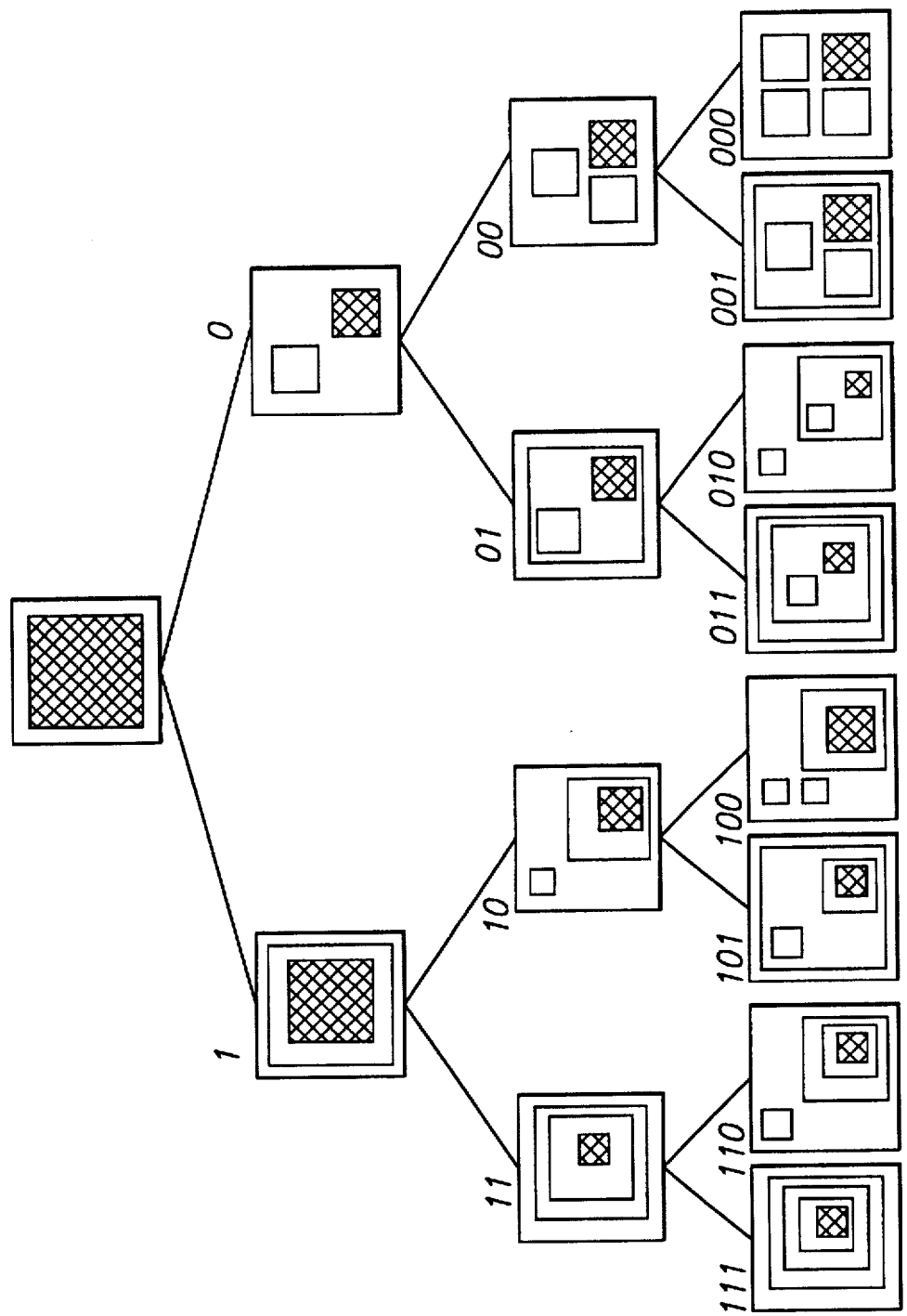
FIG. 7 is a binary tree file structure as displayed by the Icon manipulator.

FIG. 7 illustrates a typical binary tree data structure. The fragment of pseudo-code listed below could be used to create the root node of this structure and other nodes.

```
VBS (x):           /* x is a visual binary string */
    x = (1, 0);
    x = [y], VBS (y);
    x = y + [(0, 0)], VBS (y).
    y = x_0         /* y is the right successor of x */
        y = x + [(0,0)].
    y = x_1         /* y is the left successor of x */
        y = [x].
```

Figure 8:
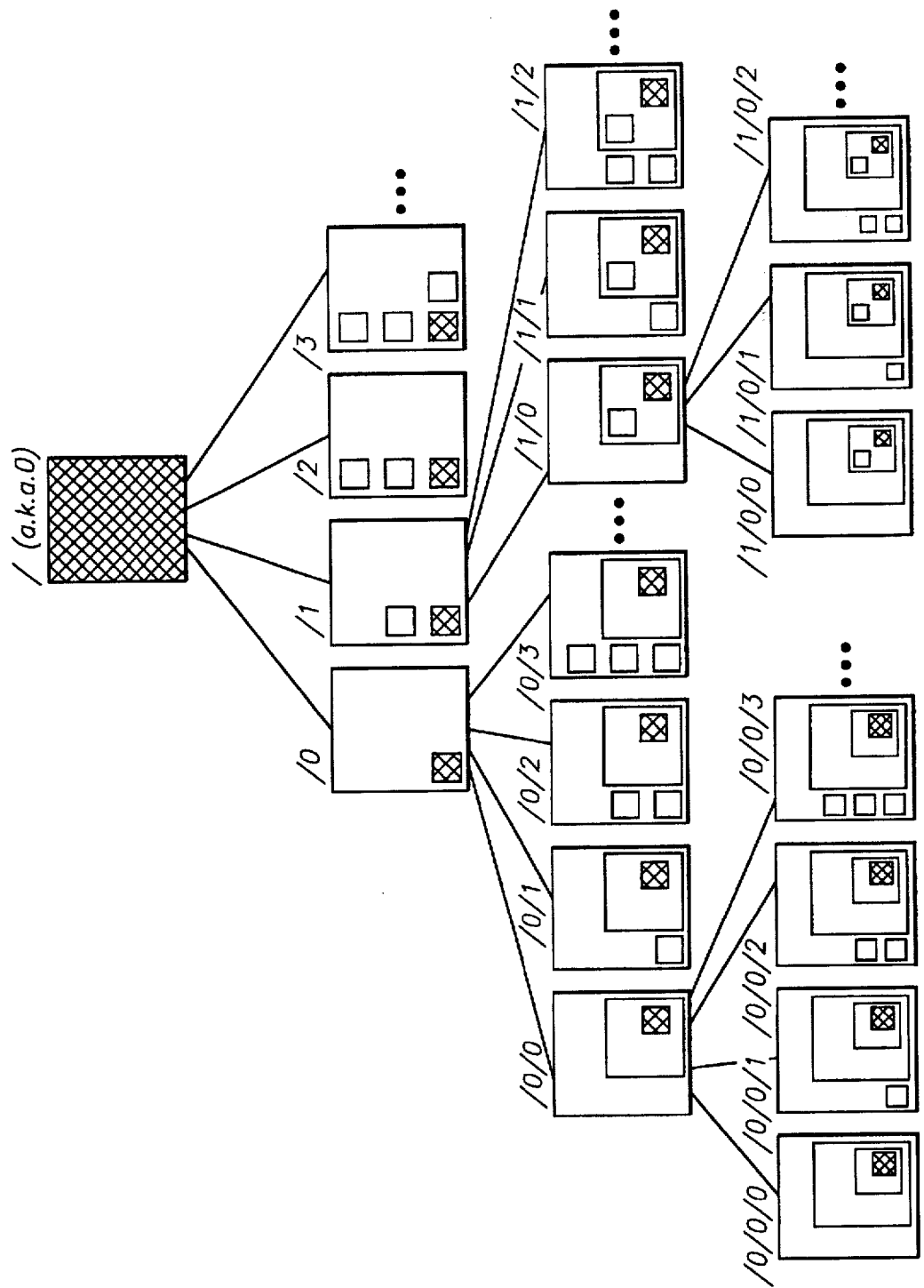
FIG. 8 is a hierarchical file structure as displayed by the Icon manipulator.

FIG. 8 illustrates a typical hierarchical file structure. The fragment of pseudo-code listed below could be used to define or select the nodes of this structure.

```
VHS (x):           /* x is a visual hierarchical string */
    x = 0;
    x = [y], VHS (y);
    x = y + [(0 0)], VHS (y).
    y = x/k         /* y is the kth successor of x */
        y = [x] + [(0, 0)] +., + [(0, 0)]with [(0, 0)] repeated k
times
```

Given below is pseudo-code form of the code, so that when interpreted according to the two dimension internal model both the present invention and its version of Boolean Prolog, yields a solution set that can be seen to interpret, in the presence of the other defined predicates, the first-order axioms of finite multiset theory. (For more information, see Theorem 4 stated in "Elementary Theory of Object Oriented Arithmetic," cited above)

```
FM (x)             /* x is a finite multiset */
    x = (0, 0);
    x = [y], FM (y);
    x = y + z, FM (y), FM(z).

Null (x)           /* x is the empty finite multiset */
    x = (0, 0).
    x = S (y)      /* x is the singleton of y */
```

```
    x = [y].
    x = U (y,z)    /* x is the multi-set union of y and z */
    x = y + z.
```

Labeled Trees

The preferred embodiments of the present invention provide a method and apparatus for efficiently hashing labeled trees, or finite sets of similarly labelled trees to virtual (logical) memory. The tree hashing algorithm accepts as input bit strings, or files of bit strings, with each input string representing, in standard notation, a labeled tree. The present invention outputs bit strings, or files of bit strings, with the output string(s) representing the hashed virtual address(es) logically associated with the labeled tree(s).

A tree is defined as any one of an infinite collection of isomorphic types of finite, connected, rooted, two-dimensional data structures commonly called trees. A tree node means, simply, a 'node', and a terminal tree node is a 'terminal node' in the usual sense. It is assumed that the only node of the unique concatenation-identity tree, 'root', is not a terminal node.

Trees are a common abstract data type used to store information, the stored information being stored 'within' or 'associated with' particular nodes. A labeled tree means a tree and associated node values with the node's value being stored within the node.

The present invention accepts two classes of tree labels. The first class of labels include terminal node labels with each terminal node storing one of k states of information. The second class of tree labels are called general or arbitrary node labels with each general node label storing one ordered k-tuple of natural numbers (note how this mirrors the definition of a Boolean Prolog K–1 table).

It is assumed that each labeled input tree is associated with one or the other of these types of nodes, but not with both types of node labels simultaneously. Stated differently, all labels of any labeled input tree or set of labeled input trees have associated with them the same dimension k.

For any natural number k, the class of all trees with labeled k+1 state terminal nodes can be seen to be algebraically the same as the class of all trees whose general nodes store k-tuples of natural numbers. This allows the present invention to preprocess its input trees uniformly, thereby converting what appear to be separate problems into a single problem.

The tree hashing method will now be described as it acts upon a single input labeled tree storing k-state information in its terminal nodes. If the input to the method is a file of terminal nodes labeled trees, the method acts separately on each of the input trees and then collects the outputs into a single file, with each entry in the output file corresponding to the same index as the corresponding entry in the input file. It is a simple task to effect these actions using the Boolean Prolog language, the natural language of the present invention.

The first step in the tree hashing method involves creating a table in the manner described earlier in this description. It should be noted that the second column of the K+1 table is defined by associating the number 2 with the index value 0 and the number p(i+k) with i, where p is the Kleene prime enumeration function. The exact size of the table used by the hashing method affects program performance. Thus, the user's needs and memory resources dictate the ultimate size of the table used by this method.

Given that a table exists, the method first decides if the input string is formed by placing some other legal input string within parenthesis or whether the input string is itself a concatenation of two or more well formed input strings.

If the string is formed by placing some legal input string in parenthesis, the method strips the outer parenthesis from the input string and the remaining string is evaluated as a subproblem using the tree hashing method. If v is the value of this subevaluation problem, the method outputs the number p(v+k) as the logical multiplicative hash value of the input. This value is found in column 2 of the value of the input. This value is found in column 2 of the row in the kth table that contains the subevaluation string whenever this string is present within the kth table.

If the string is itself a concatenation of two or more well formed input strings, the method divides or parses the input string into sub-well formed string is either listed within column 3 of the kth table or the sub-well formed string is a well-formed string enclosed within parenthesis. Each of these enclosed substrings is evaluated independently as a subproblem. After evaluating all of these subproblems, the method outputs the simple arithmetic product of the returned values of the subproblems as the multiplicative hash of its input. Note that when a constant is found in column 3 of the kth table the logical multiplicative hash value of the constant is the string index plus the Boolean Prolog's dimension.

It should be noted that if LT is a labeled tree, and i its multiplicative hashed value, then the length of LT is always less than $3*\log_2(i)$ and in the special case of K=2, the length of LT is always less than $2*\log_2(i)$. This observation allows certain memory management assumptions to be made in an efficient fashion.

Conclusion

The present invention has now been described in detail, with reference to several preferred embodiments. Numerous variations and modifications to the present invention are readily foreseeable. Nothing constrains the Icon Manipulator to display the constants as squares, the Table Facility could use different symbols to store and manipulate the data structures, and the Logic Processor can be optimized for parallel processing. Given the range of possible variations and modifications, the claims should be understood in a broad inclusive manner, not a restricted one.

Source Listing for "genprime" Program

```c
/*genprime.c -- Generate a MAX_FINDEX table of prime numbers*/
#include <stdlib.h>
#include <stdio.h>
#include <gam.h>
#define MAX_PINDEX      512
#define banner          "This is GENPRIME version 1.2"
#define PRIMES_FILE     "primetab.c"
#define PRIMES_FILE_H   "gam.hf"
prime_t           prime_table[MAX_PINDEX + 1];
short number_is_prime(n)
    prime_t         n;
    prime_t         q,
                    r,
                    k = 1; /* prime_table[k] == 1*/
    while (TRUE) {
        if ((r = n % prime_table[k]) == 0)
            return (FALSE);
        if ((q = n / prime_table[k]) <= prime_table[k])
            return (TRUE);
        --k;
    }
}
short write_files(max)
    index_ =         max;
    index_t          j;
    FILE             *fp;
```

```
         if ((fp = fopen(PRIMES_FILE, "w")) == NULL) {
                 fprintf(stderr, "GENPRIME: cannot open %s\n",
     PRIMES_FILE);
                 return (FALSE);
 5       }
         fprintf(stderr, "\nWriting the %s file...", PRIMES_FILE);
         fflush (stderr);
         fprintf(fp, "/*\n * %s -- Prime Table\n */\n\n", PRIMES_FILE);
         fprintf(fp, "/*\n * This file generated by %s.\n */\n\n", "genprime"
10       fprintf(fp, "#include <stdio.h>\n");
         fprintf(fp, "#include <qam.h>\n");
         fprintf(fp, "#include \"qam.h\"\n\n");
         fprintf(fp, "prime_t prime_table[] = {\n");
         for (j = 0; j <= max; j++)
15               fprintf(fp, "/* %4d */\t%61d,\n", j, prime_table[j]);
         fprintf(fp, "/* %4d */\t%6d,\n", j, -1);
         fprintf(fp, "};\n\n");
         fclose(fp);
         if ((fp = fopen(PRIMES_FILE_H, "w")) == NULL) {
20               fprintf(stderr, "GENPRIME: cannot open %s\n ",
     PRIMES_FILE_H);
                 return (FALSE);
         }
         fprintf(stderr, "\nWriting the %s file...", PRIMES_FILE_H);
25       fflush(stderr);
         fprintf(fp, "/*\n * %s -- Prime Table constants\n */\n */\n\n",
     PRIMES_FILE_);
                 fprint(fp, "/*\n * This file generated by %s.\n */\n\n", "genprime");
                 fprintf(fp, "#define MAX_PRIME\t%ld\n", prime_table[max]);
30               fprintf(fp, "#define MAX_PINDEX\T%d\n", max);
         fclose(fp);
     main(argc.argv)
             int     argc;
```

- 28 -

```
            char      **argv;
            prime_t            n = 3;
            index_t            j = 2;
            fprintf(stderr, "%s\n", banner);
5           fflush(stderr);
            prime_table[0] = 1;
            prime_table[1] = 2;
            fprintf(stderr, "Generating the primes...");
            fflush(stderr);
10          while (j <= MAX_PINDEX) {
                    if (number_is_prime(n))
                            prime_table[j++] = n;
                    n +=2;
            }
15          fprintf(stderr, "\nWriting the files...");
            fflush(stderr);
            write_files(MAX_PINDEX);
            fprintf(stderr, "\nDone\n");
            fflush(stderr);
20          exit(EXIT_SUCCESS);
```

Source Listing for "gentable" Program

```
       /*gentable.c -- Generate an ASCII qft table*/
       #include <stdlib.h>
       #include <string.h>
25     #include <stdio.h>
       #include <otype.h>
       #include "qam.hf"
       #include <qam.h>
       #define CWEB_FILE    "asciitable.c"
30     #define TABLE_FILE   "qam.hf"
       #define banner       "This is GENTABLE version 2.0"
       extern prime_t        prime_table[];
```

- 29 -

```
        qft_ASCII_t        qft_ASCII_table[MAX_PINDEX + 1];
        ascii_const        *constants[MAX_PINDEX + 1];
        char               gVT = 3;
        char               gHasMul = 0;
5       char               gHasPop = 0;
        char               gMulChar[2];
        char               gPopChar[2];
        short allocate_ascii_constants()
                register index_t       i;
10              register qft_ASCII_t   *q = qft_ASCII_table;
                for i = 0; i <= MAX_PINDEX; ++i, ++q) {
                        q->q_prime = prime_table[i];
                        q->q_ascii_const = 0;
                        q->q_s_ascii_const = 0;
15                      q->q_sindex = i;
                        q->q_flags = 0;
                        if (is_prime((prime_t) i))
                                P_MKPRIME(q);
                        if ((constants[i] = (ascii_const *) malloc
20      (MAX_MUL_NUM_SIZE)) ascii_const *) NULL);
                                return (FALSE);
                }
                return (TRUE);
        qft_ASCII_t *last_ascii_const_marked()
25              register index_t       i:
                register qft_ASCII_t   *q = qft_ASCII_table:
                for (i = 0; i <= MAX_PINDEX; ++i, ++q)
                        if (!P_ISMARK(q)) {
                                P_MKMARK (q);
30                              return (q);
                        }
                return ((qft_ASCII_t *) NULL);
        ascii_const *ascii_const_composite(p)
```

- 30 -

```
            prime_t          p;
            register index_t x,
                             y;
            static char      buf[MAX_MUL_NUM_SIZE];
5           if (p > MAX_PRIME)
                    return ((ascii_const *) NULL);
            for (x = 2; x < p && x < MAX_PINDEX; ++x)
                    for (y = x; y < p && y < MAX_PINDEX; ++y)
                            if (x * y == p) {
10                                  strcpy(buf, mul(its_ascii_const(x),
    its_ascii_const(y)));
                                    return (buf);
                            }
            return ((ascii_const *) NULL);
15  void compute_ascii_consts()
            register index_t         i;
            register qft_ASCII_t     *q = qft_ASCII_table:
            register qft_ASCII_t     *p;
            for (i = 0: i <= MAX_PINDEX; ++i, ++q) {
20                  if (i % 20 == 0 && i !=0)
                            fprintf(stderr. "*%04d", i);
                    if (i % 200 == 0 && i !=0)
                            fputc("\n", stderr);
                    fflush(stderr);
25                  if (i == 0) {
                            strcpy(constants[i], "()");
                            P_MKMARK(q);
                    } else if (i == 1)
                            strcpy(constants[i], "(0,0)");
30                  else if (i == 2)
                            strcpy(constants[i], "(1,0)");
                    else if (i == 3)
                            strcpy(constants[i], "(0,1)");
```

- 31 -

```
                else if (is_prime((prime_t) i)) {
                        strcpy(constants[i], "(0");
                        strcat(constats[i], last_ascii_const_marked: --
>q_asc:const):
 5                      strcat(constants[i], "0)");
                } else {
                        strcpy(constants[i], ascii_const_composite((prime_t)
                }
                q-->q_ascii_const = constants[i];
10              q-->q_s_ascii_const = q-->q_ascii_const;
        }
        int token(c)
                char            c;
                if (c == ')')
15                      return (0);
                else if (c=='(')
                        return (1);
                else
                        return 9c);
20      int const_compare(first, second)
                ascii_const     *first;
                ascii_const     *second;
                for(; token(*first) == token(*second); ++first, ++second)
                        if (*first == '\0')
25                              return (0);
                        return (token(*first) - token(*second));
        void mul_swap(left, right)
                index_t         left;
                index_t         right;
30              ascii_const     *temp;
                index_t         itemp;
                qft_ASCII_t     *qleft = &qft_ASCII_table[left];
                qft_ASCII_t     *qright = &qft_ASCII_table[right];
```

- 32 -

```
            temp = qleft-->q_s_ascii_const;
            itemp = qleft-->q_sindex;
            qleft-->q_s_ascii_const = qright-->q_s_ascii_const;
            qleft-->q_sindex = qright-->q_sindex;
 5          qright-->q_s_ascii_const = temp;
            qright-->q_sindex = itemp;
      index_t    find_pivot(i, j)
            index_t        i;
            index_t        j;
10          ascii_const    *first_key;
            index_t        k;
            first_key = qft_ASCII_table[i].q_s_ascii_const;
            for (k = i + 1; k <= j; ++k)
                  if (const_compare(qft_ASCII_table[k].q_s_ascii_const,
15    first_key) > 0)
                              return (k);
                  else if
      (const_compare(qft_ASCII_table[k].q_s_ascii_const, first_key) < 0)
                              return (i);
20          return (0);
      index_t mul_partition(i, j, pivot)
            index_t        i;
            index_t        j;
            ascii_const    *pivot;
25          index_t        l = i;
            index_t        r = j;
            do {
                  mul_swap(l, r);
                  while(const_compare(qft_ASCII_table[l].q_s_ascii_const,pivot) <
30    0)
                              ++1;
                  while(const_compare(qft_ASCII_table[r].q_s_ascii_const,pivot) >=0)
                              --r;
```

- 33 -

```
        } while (1 <= r);
        return (1);
    void const_sort(low, high)
            int         low;
5           int         high;
            index_t     pivot_index = find_pivot (low, high);
            ascii_const *pivot;
            index_t     k;
            if (low == high)
10              return;
            if (pivot_index != 0) {
                    pivot = qft_ASCII_table[pivot_index].q_s_ascii_const:
                    k=mul_partition(low, high, pivot);
                    const_sort(low, k-1);
15                  const_sort(k, high);
            }
    void sort_ascii_consts()
            const_sort(2, MAX_PINDEX);
    short write_files()
20          FILE *fp;
            if ((fp = fopen(CWEB_FILE, "w")) == (FILE *) NULL) {
                    fprintf(stderr, "GENTABLE: cannot open %s\n",
    CWEB_FILE);
                    return (FALSE);
25          }
    fprintf(stderr, "\nWriting the %s file...", CWEB_FILE):
    fflush(stderr);
    fprintf(fp, "/*\n * gentable.c -- The ASCII qft table\n */\n\n");
    fprintf(fp, "/*\n * This file, %s,", CWEB_FILE);
30  fprintf(fp, " was generated by the program %s.\n */\n\n",
            "GENTABLE");
    fprintf(fp,"#include <stdio.h>\n");
    fprintf(fp,"#include \"qam.h\"\n");
```

- 34 -

```
     {
           register index_t         j;
           register qft_ASCII_t     *q;
           fprintf(fp,"qft_ASCII_t\tqft_ASCII_table[] = {\n");
  5        for (j = 0, q = qft_ASCII_table; j <= MAX_PINDEX; j++, q++) {
                    fprintf(fp, "/* %4d */\t{%6ld, NULL, NULL, %4d, %2d}.\
                         j, ith_prime(j), its_sindex(j),
                         P_ISPRIME(q) > 0 ? P_PRIME : 0);
 10        }
           fprintf(fp, "/* %4d */\t{%6d, NULL, NULL, %4d, %2d}\n",
                    j, -1, -1, 0);
           fprintf(fp, "};\n\n");
     }
 15  {
           register index_t         j;
           fprintf(fp, "ascii_const\t*constants[] = {\n"):
           for (j = 0; j <= MAX_PINDEX; j++)
                    fprintf(fp. "/* %3d */\t\"%s\",\n", j, constants[j]);
 20        fprintf(fp, "NULL");
           fprintf(fp, "};\n");
     }
     fclose(fp);
     {
 25        if ((fp = fopen(TABLE_FILE, "a")) == (FILE *) NULL) {
                    fprintf(stderr, "GENTABLE: cannot open %s\n", TABLE_FILE);
                    return (FALSE);
           }
 30        fprintf(stderr, "\nWriting the %s file...", TABLE_FILE);
           fflush(stderr);
           fprintf(fp, "\n/*\n * This section generated by %s.\n */\n\n", "gentable");
```

```
                                    - 35 -

{
                 register index_t    j:
                 int                 ascii_const_array_size = 0;
                 int                 max_ascii_const_size = 0;
5                int                 this_size = 0;
                 for (j = 0; j <= MAX_PINDEX; ++j) {
                         this_size = strlen(qft_ASCI_table[j].q_ascii_const):
                         ascii_const_array_size += this_size;
                         max_ascii_const_size = this_size >
10       max_ascii_const_size ? this_size;
                         max_ascii_const_size;
                 }
                 fprintf(fp, "#define MAX_MUL_NUM_ARRAY\t%d\n",
         ascii_const_array_size);
15               fprintf(fp, "#define ACT_MAX_MUL_NUM_SIZE\t%d\n",
         max_ascii_const_size);
                 }
                 fprintf(fp, "#define gVT\t%d\n", gVT);
                 fprintf(fp, "#define gHasMul\t%d\n", gHasMul);
20               fprintf(fp, "#define gMulChar\t\"%s\"\n", gMulChar);
                 fprintf(fp, "#define gHasPop\t%d\n", gHasPop);
                 fprintf(fp, "#define gPopChar\t\"%s\"\n", gPopChar);
                 fclose(fp);
         }
25       return (TRUE);
         char extract_symbol(optarg)
                 char         *optarg;
                 switch (*optarg) {
                         case '\'':
30                       case '\"':
                                 return(optarg[1]);
                 default:
                         if(isprint(*optarg))
```

- 36 -

```
                    return(*optarg);
            else
                    return(0);
    }
5   main(argc, argv)
            int     argc;
            char    **argv;
            register index_t i;
            fprintf(stderr, "%s\n", banner);
10          fflush(stderr);
            {
                    extern int      getopt();
                    char            *usage = "genarray [-v gen -m 'mul' -p 'pop']";
15                  register char   c;
                    extern char     *optarg;
                    while((c=getopt(argo.argv,"v:m:p:")) !=-1)
                            switch(c){
                                    case 'v':
20                                          gVT=atoi(optarg);
                                            break;
                                    case 'm':
                                            gHasMul=1;
                                            gMulChar[0]=extract_symbol(optarg);
25                                          gMulChar[1]='\0';
                                            break;
                                    case 'p':
                                            gHasPop=1;
                                            gPopChar[0]=extract_symbol(optarg);
30                                          gPopChar[1]='\0';
                                            break;
                                    default:
                                            fprintf(stderr,"usage: %s\n",usage);
```

- 37 -

```
                                fflush(stderr);
                                exit(EXIT_FAILURE);
                }
                if(gHasMul)
5                       fprintf(stderr,"Concatenation character =
        %s\n",gMulChar);
                        if(gHasPop)
                                fprintf(stderr,"Encapsulation character =
        %s\n",gPopChar);}
10      fprintf(stderr, "Allocating strings...");
        fflush(stderr);
        if(!allocate_ascii_constants()) {
                        fprintf(stderr, "Not enough memory\n");
                        fflush(stderr);
15                      exit(EXIT_FAILURE);
        }
        fprintf(stderr, "\nGenerating QFT.%d...\n", gVT);
        fflush(stderr);
        compute_ascii_consts();
20      fprintf(stderr, "\nSorting QFT.%d...", gVT);
        fflush(stderr);
        sort_ascii_consts();
        fprintf(stderr,"\nWriting the output files...");
        fflush(stderr);
25      write_files();
        fprintf(stderr,"\nDone.\n");
        fflush(stderr);
        exit (EXIT_SUCCESS);

Forma Grammar Listing for the Logic Processor
30      token NAME NNUMBER ADD NOT AND OR
        sentence
                        : quantifiers '(' equation ')'
```

- 38 - quantifiers

: quantifier

| quantifiers quantifier quantifier

5      : existential_quantifier

| universal_quantifier existential_quantifier

: 'E' NAME universal_quantifier

10    : 'A' NAME equations

: bool_equation

| equations bool_op bool_equation bool_equation

15    : equation bool_op equation

| NOT equation bool_op

: AND

| OR 20  equation

:qbp_terms '=' qbp_terms qbp_terms

: qbp_term

| '(' NNUMBER qbp_mterms NNUMBER ')'

25  qbp_mterms

: qbp_term

| qbp_mterms qbp_term qbp_term

: terms

30    | '(' NNUMBER terms NNUMBER ')' terms

: term

| terms term

- 39 -

```
term
        : qbp_var
        | qbp_constant
qbp_var
        : NAME
qbp_constant
        : /* */
        | '(' NNUMBER constants NNUMBER ')'
constants
        : constant
        | constants constant
constant
        : qbp_constant
```

What is claimed is:

1. A system for the creation, organization, and manipulation of data structures comprising:

data structure generation means for providing a table including a plurality of data structures, said data structure generation means includes means for providing a list of prime numbers, means for providing a unique data structure for each prime number and means for sorting the data structures to provide the table;

logic processor means coupled to the data structure generation means, for organizing subsets of the table into one of a plurality of data structures including binary trees, linked lists and hierarchical files and for manipulating the subsets according to instructions received from a first calling program; and interface means coupled to the logic processor means, for receiving instructions from the first calling program, for translating the instructions into a language conforming with the logic processor means and for translating results from the logic processor into a language conforming with the first calling program.

2. The system of claim 1, wherein said data structure generation means includes means for providing a font pattern for each prime number.

3. The system of claim 1, wherein said data structure generation means includes means for:

providing the list of prime numbers, the list being indexed by an index k running from 1 to n, such that when k equals 1, the prime number being indexed is 2;

providing a first function which accepts a data structure in a predefined form and returns the data structure in encapsulated form;

providing a second function which returns the sum of two data structures;

providing a data structure list, the list being indexed by an index i running from 0 to n, each data structure indexed by i also having a prime number indexed by k associated therewith;

when i equals 0, assigning a data structure to the data structure list;

when i equals 1, assigning a data structure to the data structure list;

when i equals 2, assigning a data structure to the data structure list;

when i equals 3, assigning a data structure to the data structure list;

when i is greater than 3 and a prime number:

finding the value of k, such that the prime number referenced by k is equal to i;

subtracting 2 from the value of k; and performing the first function on the data structure associated with k minus 2, and assigning the result of the first function to index i; and when index i is greater than 3 and not a prime number:

finding a multiplicand and a multiplicator whose product is index i; and performing the second function on the data structures associated with said multiplicand and multiplicator and assigning the result of the second function to index i.

4. In the system of claim 3, the sum function being defined as adding the left and right numeric tags of the two data structures and simultaneously string concatenating the middle and interior portions of the data structures.

5. The system of claim 3, further comprising display means for displaying the data structures.

6. The system of claim 5, wherein the display means displays each individual data structure using an individually assigned collection of a single geometric shape.

7. The system of claim 6, wherein the geometric shape is a square and wherein the encapsulation function comprises surrounding a first square with a second larger square.

8. A method of manipulating data structures using a memory, interface and processor, comprising the steps of:

storing in the memory a table including a plurality of prime numbers and a unique data structure associated with each prime number;

receiving in the interface an instruction from a calling procedure;

receiving in the processor the instruction; associating at least a portion of the instruction with at least one of the unique data structures;

manipulating in the processor the table according to the instruction; and providing in the interface a response to the instruction, at least a portion of the response being associated with at least one of the unique data structures.

9. The method of claim 8, further comprising the steps of:

translating in the interface the instruction from a first language to a second language; and translating in the interface the response from the second language to the first language.

10. The method of claim 8, wherein:

the manipulating step includes the step of organizing subsets of the table into one of a plurality of data structures including binary trees, linked lists and hierarchical files and manipulating the subsets according to the instruction.

11. The method of claim 8, further comprising the steps of:

storing in the memory the prime numbers indexed by an index k running from 1 to n, such that when k equals 1, the prime number indexed is 2;

storing in the memory a first procedure which accepts a data structure in a predefined form and returns the data structure in encapsulated form;

storing a second procedure which returns the sum of two data structures;

storing in the memory a data structure list indexed by an index i running from 0 to n, each data structure indexed by i also having a prime number indexed by k associated therewith;

when i equals 0, assigning a data structure to the data structure list;

when i equals 1, assigning a data structure to the data structure list;

when i equals 2, assigning a data structure to the data structure list;

when i equals 3, assigning a data structure to the data structure list;

when i is greater than 3 and a prime number:

finding the value of k, such that the prime number referenced by k is equal to i;

subtracting 2 from the value of k; and performing the first function on the data structure associated with k minus 2, and assigning the result of the first function to index i; and when index i is greater than 3 and not a prime number:

finding a multiplicand and a multiplicator whose product is index i; and performing the second function on the data structures associated with said multiplicand and multiplicator and assigning the result of the second function to index i.

12. An apparatus for manipulating data structures, comprising:
- a memory circuit configured to store a table including a plurality of prime numbers and a unique data structure associated with each prime number;
- an interface circuit configured to receive an instruction from a calling procedure and configured to provide a response to the instruction; and
- a processor circuit coupled to the memory circuit and the interface circuit and configured to receive the instruction, to associate the instruction with a portion of the table, to manipulate a portion of the table according to the instruction and to provide the response to the interface circuit corresponding to the instruction and associated with a portion of the table.

13. The apparatus of claim 12, wherein:
the interface circuit is configured receive the instruction from the calling procedure in a first language, to translate the instruction into a second language to provide to the processor circuit, to receive the response in the second language and to translate the response into the first language to provide to the calling procedure.

14. The apparatus of claim 13, wherein:
the processor circuit is configured to organize subsets of the table into one of a plurality of data structures including binary trees, linked lists and hierarchical files and to manipulate the subsets according to the instruction.

15. The apparatus of claim 13, wherein the processor circuit is configured to:
- provide the prime numbers indexed by an index k running from 1 to n, such that when k equals 1, the prime number indexed is 2;
- perform a first procedure which accepts a data structure in a predefined form and returns the data structure in encapsulated form;
- perform a second procedure which returns the sum of two data structures;
- provide a data structure list indexed by an index i running from 0 to n, each data structure indexed by i also having a prime number indexed by k associated therewith;
- when i equals 0, assign a data structure to the data structure list;
- when i equals 1, assign a data structure to the data structure list;
- when i equals 2, assign a data structure to the data structure list;
- when i equals 3, assign a data structure to the data structure list;
- when i is greater than 3 and a prime number:
  find the value of k, such that the prime number referenced by k is equal to i;
  subtract 2 from the value of k; and
  perform the first function on the data structure associated with k minus 2, and assign the result of the first function to index i; and
- when index i is greater than 3 and not a prime number:
  find a multiplicand and a multiplicator whose product is index i; and
  perform the second function on the data structures associated with said multiplicand and multiplicator and assign the result of the second function to index i.

16. The apparatus of claim 13, wherein:
the processor circuit is configured to associate each prime number with a data structure and a font pattern.

17. The apparatus of claim 12, wherein:
the processor circuit is configured to organize subsets of the table into one of a plurality of data structures including binary trees, linked lists and hierarchical files and to manipulate the subsets according to the instruction.

18. The apparatus of claim 12, wherein the processor circuit is configured to:
- provide the prime numbers indexed by an index k running from 1 to n, such that when k equals 1, the prime number indexed is 2;
- perform a first procedure which accepts a data structure in a predefined form and returns the data structure in encapsulated form;
- perform a second procedure which returns the sum of two data structures;
- provide a data structure list indexed by an index i running from 0 to n, each data structure indexed by i also having a prime number indexed by k associated therewith;
- when i equals 0, assign a data structure to the data structure list;
- when i equals 1, assign a data structure to the data structure list;
- when i equals 2, assign a data structure to the data structure list;
- when i equals 3, assign a data structure to the data structure list;
- when i is greater than 3 and a prime number:
  find the value of k, such that the prime number referenced by k is equal to i;
  subtract 2 from the value of k; and
  perform the first function on the data structure associated with k minus 2, and assign the result of the first function to index i; and
- when index i is greater than 3 and not a prime number:
  find a multiplicand and a multiplicator whose product is index i; and
  perform the second function on the data structures associated with said multiplicand and multiplicator and assign the result of the second function to index i.

19. The apparatus of claim 12, wherein:
the processor circuit is configured to associate each prime number with a data structure and a font pattern.

* * * * *